Nov. 19, 1940.                J. BEIER                2,222,281
                          FRICTION WHEEL GEAR
              Filed Aug. 12, 1939          2 Sheets-Sheet 1
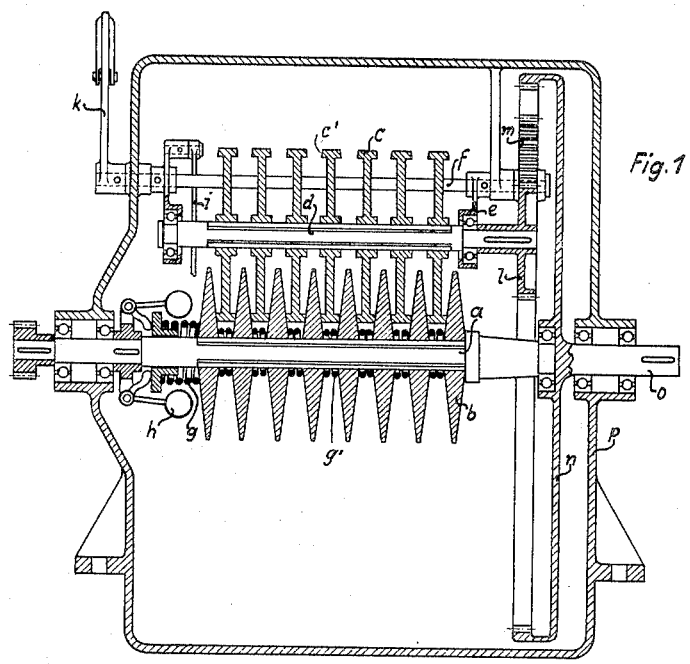
Fig. 1
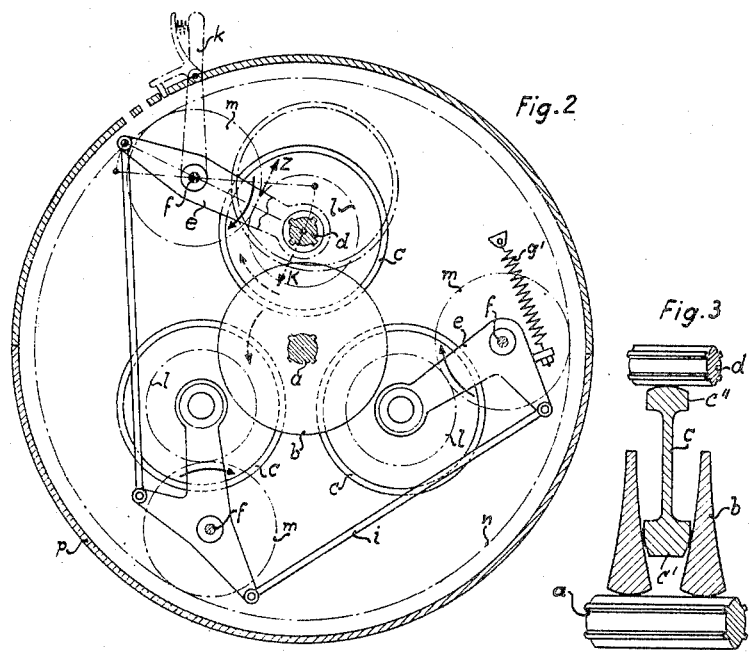
Fig. 2
Fig. 3
INVENTOR
JOSEF BEIER.
BY
Karl A. Mayr
ATTORNEY

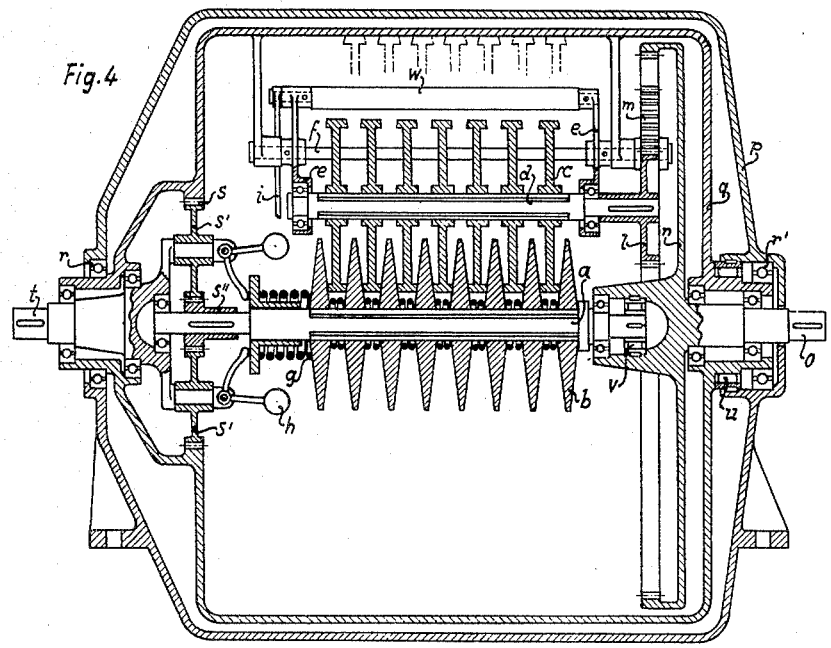

Patented Nov. 19, 1940

2,222,281

UNITED STATES PATENT OFFICE 2,222,281

FRICTION WHEEL GEAR

Josef Beier, Mannheim-Feudenheim, Germany

Application August 12, 1939, Serial No. 289,752
In Germany February 1, 1938

16 Claims. (Cl. 74—190.5)

The present invention relates to improvements in variable speed frictional power transmissions.

In conventional friction wheel gears having variable speed ratio the necessary friction forces are produced at relatively few contact points only; because of the unavoidable lubrication, high contact pressures are required and it is difficult for constructional reasons to so journal a great number of friction bodies that the displaceability of the frictional members, which displaceability is fundamentally necessary for changing the speed ratio of the transmission, remains unaffected. The small number of contact points necessitates high contact pressures which cause great friction losses in the bearings, because when metal is rolling on metal, the contact pressures must be 30 to 40 times as great as the required frictional force.

In some conventional friction gears the friction bodies are surrounded, for counteracting the bearing pressures, by rings which are pressed against said bodies more strongly, the higher the required friction force becomes. As in such an arrangement the friction bodies roll directly on each other or with interposed friction bodies, all contact pressures cancel one another and therefore cause no friction losses in the bearings. Since in constructions of this kind the change in the ratio of speed must be fundamentally effected by axial displacement of the frictional bodies and in most cases of the rings as well, only few friction bodies and consequently only few points of contact can be arranged without exceeding given space limitations.

With a great number of contact points small dimensions are possible only when the change of speed of the transmission is brought about by a radial displacement of the friction bodies. In order to keep the bearing pressures low, the friction bodies must then be so constructed that only a small component of the contact pressure acts in a radial direction. In the friction wheel gear forming the subject matter of the present invention the friction bodies have the form of flat cone discs, which are axially pressed together. Furthermore the friction bodies are so arranged that there is the same contact pressure at all points of contact and the contact pressure remains unaltered even in the case of wear because the friction bodies are pressed together axially by a spring arrangement.

Further and other objects and advantages of the present invention will be apparent from the accompanying specification and claims and shown in the drawings which, by way of illustration, show what I now consider to be preferred embodiments of my invention.

In the drawings:

Figure 1 is a diagrammatic longitudinal sectional view of a variable speed transmission according to the present invention.

Figure 2 is a cross sectional view of the transmission shown in Figure 1.

Figure 3 is a large scale diagrammatic illustration of a detail of the transmission shown in Figures 1 and 2.

Figure 4 is a longitudinal sectional view of a modified variable speed transmission according to the present invention.

Figure 5 is a longitudinal sectional view of another modification of a transmission according to the present invention.

Referring more particularly to Figure 1 which is a longitudinal section and to Figure 2 which is a cross-section through the new gear, a number of frictional bodies $b$ are axially slideably arranged next to one another on shaft $a$ having key ways. These friction bodies, hereinafter referred to as cone discs, are held in planes perpendicular to their axes by means of two or more, preferably three, rows of friction discs $c$ which discs are arranged next to one another and extend inbetween and frictionally engage said cone discs; the individual rows of friction discs are slideably arranged on a corresponding number of shafts $d$, in the present case three, which shafts are also provided with key ways. As the friction bodies $b$ and $c$ rotate in opposite direction, the rims $c'$ of the friction bodies $c$ are very thin in order to reduce relative sliding due to the difference in the radii of engagement. The hubs $c''$ of the rimmed discs $c$ which, because of their small thickness, produce little guidance are barrel shaped at the bore; the same is the case with the cone discs so that the rimmed discs as well as the cone discs can assume a slightly inclined position with respect to their shaft. Because of their high operating speeds and centrifugal forces produced thereby, they set themselves automatically perpendicular to the shaft $d$. The shafts $d$ are journalled in rockable levers $e$ which are individually keyed to shafts $f$ extending from one end of the transmission to its other end. When the rockable levers $e$ are turned about shafts $f$ in the direction of the full line arrows, the outer shafts $d$ approach the central shaft $a$ and the rimmed discs $c$ center and engage more deeply between the cone discs $b$ thereby increasing the ratio of transmission between the centre shaft $a$ and the outer shafts $d$. At the same time the cone discs $b$ are pushed apart axially against the action of spring $g$ which produces the necessary contact pressure, which pressure is propagated from the first cone disc, against which the spring pressed directly, to the last cone disc at the other end of the shaft. As the ratio of transmission between the centre shaft $a$ and the outer shafts $d$ increases, the contact pressure is automatically increased by the increasing spring pressure. Through a suitable design of the spring the contact pressure can be brought to any desired relation to the change of transmission ratio. The contact pressure, however, can be made dependent by means of the spring $g$ on other characteristics, for instance, in the embodiment of the invention shown in Figure 1 on the rotational speed by means of centrifugal weights $h$.

By this arrangement, upon dropping of the speed of the drive to a predetermined value, for example, the idling speed, the spring $g$ is caused to become entirely unstressed and the frictional contact between the cone discs $b$ and the rim discs $c$ to cease completely, so that these discs separate from one another. This separation can be further assisted by weak springs $g'$ arranged between the individual cone discs. Should the speed of revolution of the drive increase, however, the spring $g$ again becomes stressed and the frictional contact is reestablished. The gear can thus also be used as a speed responsive coupling.

In order that the outer shafts $d$ shall, at all ratios of transmission, occupy the same distance from the centre shaft $a$, the rocking motions of the rockable levers $e$ may be kept positively equal by interconnecting said levers by means of coupling rods $i$ or toothed wheels. With this construction it is possible to adjust any ratio of transmission by moving a lever $k$ from the outside. From the outer shafts $d$ the rotary motion is transmitted through the pinions $l$ keyed to said shafts and the toothed wheels $m$ supported by the shafts $f$ to the common toothed wheel $n$ and through it to the shaft $o$ which is journalled in the gear casing $p$.

An advantage of the new gear is, that it can readily be constructed as a completely automatic gear, that is to say, that any optional ratio of transmission will adjust itself entirely automatically in dependence on any physical quantity, for instance, the torque at the power output side or the speed of revolution at the power imput side. If the rockable levers $e$ are not held to a definite ratio of transmission by the handle $k$, the rim discs $c$ will be forced by the force K acting on the outer shafts $d$, which is equal to the tooth pressure Z and consequently proportional to the given off torque, concentrically between the cone discs $b$ until the sum of the radially outwardly acting components of the axial pressure of the spring $g$ balances the force K, resulting in a definite ratio of transmission. By suitably forming the spring $g$ it is for instance possible, at doubled output torque, to cause the ratio of transmission to increase to double value, that is to say, the speed of revolution at the output end to drop to half the value, the power output and power input thus remaining equal and the driving speed and torque also remaining unaltered. When, for example, the input speed is reduced, the spring $g$ will be somewhat relieved by the centrifugal weights $h$, and the rim discs $c$ will be forced deeper between the cone discs $b$ and the output speed will also drop, the output torque remaining constant, that is to say, in this case the output power will also drop, as desired. If, in order to save the friction discs, the full forces are not to be caused to act by way of these discs on the spring $g$, additional springs $g'$ may be provided at the system of the coupled rockable levers, which additional springs may as well as the main spring $g$ be brought into dependence on the torque or the speed of revolution so that automatic adjustment of the ratio of transmission is effected.

In order to bring the radial component, above referred to, of the axial pressure of the spring $g$, which acts in opposition to the tooth pressure Z, into optional dependence on the ratio of transmission, the genetrix of the cone discs may, according to Fig. 3, instead of being a straight line be a concave or convex curve. The genetrix of the rim of the rim disc will then also correspondingly be a curve.

For increasing the life of the friction discs or for preventing losses, the gear may be so constructed that, in the case of output torques which are smaller than the greatest imput torque, in which case change of speed between input and output side is no longer necessary, for instance in vehicles while travelling on the level or on a slight upward incline, the friction discs will be stationary relatively to one another and the input side coupled directly with the output side.

As will be seen from Fig. 4 which shows a longitudinal section through the gear the outer shafts $d$ and the rockable levers $e$ with their pivots $f$ are in this case for instance carried by a drum $q$ which with its bearings $r$ and $r'$ is supported in the gear casing $p$. In this drum is mounted the outer wheel $s$ of a planet wheel system, the planet wheels $s'$ of which are driven by the stub shaft $t$, whilst its sun wheel $s''$ is keyed rigidly on the central shaft $a$ and drives the latter with gearing up ratio.

As long as the output torque at the stub shaft $o$ is greater than the input torque at the stub shaft $t$, there is no difference from the previously described construction, for the drum $q$ is forced by the difference in torque or the reaction torque in the opposite direction to the driving direction against the free wheel arrangement $u$ and will therefore remain stationary. Only when with decreasing output torque the rim discs have moved so far out of the cone discs that the total ratio of transmission from the input stub shaft $t$ to the output stub shaft $o$ reaches the value $l$, that is to say input and output torque and input and output speed are equal, will the drum $q$ commence to rotate in the same sense as the driving direction of rotation. This causes the difference in speed of revolution between the input stub shaft $t$ and the outer wheel $s$ to drop and with it the speed of revolution of the planet wheels $s'$, the sun wheel $s''$ and the central shaft $a$. The drum $q$ rotates more and more rapidly, as at this drum only accelerating forces act. Finally the planet wheels $s'$ come to rest on their journals and the speed of revolution of the sun wheel $s''$ and of the central shaft $a$ becomes equal to the input speed of revolution or, owing to the ratio of transmission being equal to $l$, equal to the output speed of revolution. Thereupon any further increase in the speed of revolution of the drum, which at this moment is also equal to the input or output speed of revolution, and consequently a further drop in the speed of revolution of the sun wheel and of the central shaft $a$ below this speed of revolution, which is common to all the other rotating parts, is prevented by the free wheel arrangement $v$ which prevents an oppositely directed rotary motion of the central shaft $a$ and the output stub shaft $o$. Thus all parts of the gear will now rotate at the same speed of revolution and the friction discs are stationary with respect to one another. In order to counteract the moment of the centrifugal force of the rim discs $c$ about the pivots $f$ counter weights $w$ are provided on the rockable levers.

The same effect as that provided by the free wheel arrangement $v$ can also be obtained through the rim discs $c$, as shown in broken lines in Fig. 4, bearing in their outermost position against the inside of the drum $q$ so as to be held by friction, and thereby producing the coupling of all rotating parts.

In order that, at higher performances of the gear, in the coupling state just described the mass of the rim discs, which in then greater, shall not rotate at the full speed of revolution of the motor, the gear may be so constructed in accordance with Fig. 5 that the friction discs will then be stationary, not only relatively but in space as well.

With this object in view a planet wheel system is mounted at the output side as well, the outer wheel $x$ of which is coupled with the outer wheel $s$ of the planet wheel system on the input side by way of toothed wheels $x_2$ and $s_2$ through the shaft $y$ which is journalled in the casing $p$. The sun wheel $x''$ is driven by the toothed wheels $m$ journalled on the rocking pivots $f$ by way of the toothed wheel $n$ which is common to the said toothed wheels $m$. The planet wheels $x'$ drive the output stub shaft $o$ by way of their bearing journals. As long as the output torque at the stub shaft $o$ is greater than the input torque at the stub shaft $t$, that its to say, as long as the total ratio of transmission is smaller than 1, there is no difference as compared with the construction shown in Fig. 1, for the shaft $y$ and the outer wheels $x$ are forced by the difference in torque or the reaction torque against the free wheel arrangement $u$, as is the drum $q$ in Fig. 4, and are therefore stationary. Only when, as in the other case, the rim discs $c$ have moved so far out of the cone discs $b$ that the total ratio of transmission attains the value 1, will the wheels $x'$, $x_2$, $s$ and $s_2$ and the shaft $y$ commence to rotate more and more rapidly in the same sense as the rotary direction of the drive, whilst the speed of revolution of the sun wheels $s''$ and $x''$ will drop until they come to rest or would even reverse their direction of rotation, if they were not prevented from doing so by the free wheel arrangement $v$.

The mode of operation of the construction shown in Fig. 5 is thus the same as that shown in Fig. 4, with the exception that in the coupled state the planet wheels no longer remain stationary on their journals, as the latter rotate at the speed of revolution of the drive and the planet wheels roll on the stationary sun wheels $s''$ and $x''$. Furthermore, the outer wheels do not in this case rotate at the speed of revolution of the drive, but more rapidly corresponding to the ratios of the toothed wheels of the planet wheel systems.

The most important advantages of the transmission according to the present invention are as follows:

1. The great number of contact points permits lower contact pressures and consequently a high speed of revolution of the friction discs, so that great forces can be transmitted;

2. The axial pressing against one another of the friction discs by means of the spring $g$ has the effect that even considerable wear will not change the contact pressures to any appreciable extent;

3. Low cost of manufacture, as the friction discs are well suited to mass production, on account of their simple form, and gears of different powers can be built up by stringing a greater or smaller number of friction discs on the shaft;

4. The simplicity of the general construction, owing to which the gear can be constructed as an independent gear, more particularly owing to the journalling of the outer shafts on rockable levers which because of the tooth pressure acting against spring $g$ and additional springs $g'$ rock to a greater or smaller extent and thereby change the ratio of transmission. This simple rocking motion and consequently the change in the ratio of transmission immediately follows the most rapid changes in the load;

5. The possibility provided by the complete relief of the spring $g$ of using the gear as a coupling as well;

6. The possibility of an exact accommodation of the spring $g$ to a characteristic similar to a hyperbola, which brings about an exactly constant taking up of power by the gear at the different output torques, is favorable for a driving motor, for example, a Diesel engine of constant power, which is highly sensitive to the exceeding of a definite driving torque;

7. The possibility, by constructing the gear in accordance with Figs. 4 or 5, of relatively or absolutely bringing the friction discs to rest at smaller output torques for instance when travelling on the level, which prevail during the greater part of operation, and of thereby lengthening the life of the gear to a corresponding extent.

I claim:

1. A speed changing frictional power transmission, comprising a center shaft, a set of friction members axially displaceably connected and rotating with and being free to assume an inclined position with respect to said center shaft, a plurality of outer shafts, a set of counterfriction members axially movably connected and rotating with and being also free to assume an inclined position with respect to said outer shafts and frictionally engaging and individually extending between said first mentioned friction members, supporting means rotatably supporting said shafts, and position changing means associated with said supporting means for changing the position of said outer shafts with respect to said center shaft.

2. A speed changing frictional power transmission comprising a center shaft, a plurality of friction members rotating with and being axially displaceably connected with and free to assume an inclined position with respect to said center shaft, a plurality of other shafts disposed equidistantly around said center shaft, a plurality of counterfriction members axially movably connected with and being free to assume an inclined position with respect to said other shafts and frictionally engaging and individually extending between said first mentioned friction members and maintaining said first mentioned members in perpendicular position with respect to said shafts, supporting means rotatably supporting said shafts, position changing means connected with the supporting means of said other shafts for changing the position and distance of said other shafts from said center shaft, and a plurality of gear wheels operatively interconnecting said other shafts.

3. A speed changing frictional power transmission comprising a center shaft, a plurality of friction members rotating with and being axially displaceably and rockingly connected with said center shaft, a plurality of other shafts disposed equidistantly around said center shaft, a plurality of counterfriction members axially movably and rockingly connected with said other shafts and frictionally engaging and individually extending between said first mentioned friction members and maintaining said first mentioned members in perpendicular position with respect to said shafts, supporting means rotatably supporting said shafts, interconnected position changing means connected with the supporting means of said other shafts for equally and simultaneously changing the position and distance of said other shafts from said center shaft, and gearing means interconnecting said other shafts.

4. A speed changing frictional power transmission, comprising a center shaft, a set of friction members axially displaceably and rockingly connected and rotating with said center shaft, a plurality of outer shafts, a set of counterfriction members axially movably and rockingly connected and rotating with said outer shafts and frictionally engaging and individually extending between said first mentioned friction members, supporting means rotatably supporting said shafts, and position changing means associated with said supporting means for changing the position of said outer shafts and the distance of said shafts from said center shaft, speed responsive means connected with one of said shafts, adjustable compression means connected with one set of said friction members and with said speed responsive means and pressing said members to one another at a pressure which depends on the speed of one of said shafts.

5. A speed changing frictional power transmission, comprising a center shaft, a set of friction disc members axially displaceably and rockingly connected and rotating with said center shaft, a plurality of outer shafts, a set of counter friction disc members axially movably and rockingly connected and rotating with each of said outer shafts and frictionally engaging and individually extending between said first mentioned friction members and maintaining said first mentioned members in perpendicular position with respect to said shafts, supporting means rotatably supporting said shafts, and position changing means associated with said supporting means for changing the position of said outer shafts and the distance of said outer shafts from said center shaft, the thickness of the friction disc members connected with said center shaft being greater at the center and tapering off towards the periphery, spring means connected with one set of said friction members and pressing said members to one another at a pressure which depends on the relative position of said friction members and thereby on the speed changing ratio of said transmission.

6. A speed changing frictional power transmission comprising a center shaft, a plurality of friction disc members rotating with and being axially displaceably and rockingly connected with said center shaft and having a thickness which is greater at the center and tapers off towards the periphery of said disc members, a plurality of other shafts disposed equidistantly around said center shaft, a plurality of counter friction members axially movably and rockingly connected with each of said other shafts and frictionally engaging and individually extending between said first mentioned friction members, supporting means rotatably and swingably individually supporting said other shafts, gear wheels connected with said other shafts, other gear wheels individually engaging said first mentioned gear wheels and rotating about the swing center of said supporting means, a gearing interconnecting said other gear wheels, the position of said supporting means and of said other shafts and thereby the distance of said other shafts from said center shaft depending on the tooth pressure between said first mentioned gear wheels and said other gear wheels.

7. A speed changing frictional power transmission comprising a center shaft, a plurality of friction disc members rotating with and being axially displaceably and rockingly connected with said center shaft and having a thickness which is greater at the center and tapers off towards the periphery of said disc members, a plurality of other shafts disposed equidistantly around said center shaft, a plurality of counter-friction members axially movably and rockingly connected with each of said other shafts and frictionally engaging and individually extending between said first mentioned friction members, supporting means rotatably and swingably individually supporting said other shafts, gear wheels connected with said other shafts, other gear wheels individually engaging said first mentioned gear wheels and rotating about the swing center of said supporting means, a gearing interconnecting said other gear wheels, the position of said supporting means and of said other shafts and thereby the distance of said other shafts from said center shaft depending on the tooth pressure between said first mentioned gear wheels and said other gear wheels and resilient means connected with said supporting means and counteracting said tooth pressure and forcing said other shafts connected to said supporting means towards said center shaft.

8. A speed changing frictional power transmission, comprising a center shaft, a set of friction members axially displaceably and rockingly connected with and rotating with said shaft, a plurality of outer shafts, a set of counterfriction members axially movably and rockingly connected with and rotating with said outer shafts and frictionally engaging and individually extending between said first mentioned friction members, supporting means rotatably supporting said outer shafts and being rotatable about center shaft, said supporting means comprising a free wheel coupling which prevents rotation of said supporting means in one direction, and position changing means associated with said supporting means and with said outer shafts for changing the distance between said center shaft and said outer shafts.

9. A speed changing frictional power transmission, comprising, in combination, an exterior shaft, an interior shaft disposed coaxially with said exterior shaft, a set of friction members axially displaceably connected and rotating with said interior shaft, another shaft, a set of counterfriction members axially movably connected and rotating with said other shaft and frictionally engaging and individually extending between said first mentioned friction members, supporting means rotatably supporting said other shaft and being rotatable about the axis of said interior shaft, a planetary gear operatively interconnecting said supporting means and said interior shaft and said exterior shaft, said gear comprising a plurality of planet wheels the axes of which are disposed equidistantly from and adapted to rotate with said exterior shaft, said supporting means comprising a free wheel coupling which locks said supporting means in one direction of rotation, and position changing means connected with said supporting means and said other shaft for changing the distance between said interior and said other shaft.

10. A speed changing frictional power transmission comprising, in combination, an exterior shaft, an interior shaft disposed coaxially with said exterior shaft, a set of friction members axially displaceably connected and rotating with said interior shaft, another shaft, a set of counterfriction members axially movably connected and rotating with said other shaft and frictionally engaging and individually extending between said first mentioned friction members, supporting means rotatably supporting said other shaft and being rotatable about the axis of said interior shaft, a planetary gear operatively interconnecting said supporting means and said interior shaft and said exterior shaft, position changing means connected with said supporting means and said other shaft for changing the distance between said interior shaft and said other shaft, a stationary casing rotatably supporting said exterior shaft and said supporting means, and free wheeling means interposed between said casing and said supporting means and locking said supporting means in one direction of rotation.

11. A speed changing frictional power transmission comprising, in combination, an exterior shaft, an interior shaft disposed coaxially with said outer shaft, a set of friction members axially displaceably connected and rotating with said interior shaft, another shaft, a set of counterfriction members axially movably connected and rotating with said other shaft and frictionally engaging and individually extending between said first mentioned friction members, supporting means rotatably supporting said other shaft and being rotatable about the axis of said interior shaft, a planetary gear operatively interconnecting said supporting means and said interior shaft and said exterior shaft, position changing means connected with said supporting means and said other shaft and changing the distance between said interior shaft and said other shaft, a free wheeling means connected with said interior shaft and locking said interior shaft in one direction of rotation, and another free wheeling means connected with said supporting means and locking said supporting means in one direction of rotation.

12. A speed changing frictional power transmission comprising, in combination, an exterior shaft, an interior shaft disposed coaxially with said outer shaft, a set of friction members axially displaceably connected and rotating with said interior shaft, another shaft, a set of counter-friction members axially movably connected and rotating with said other shaft and frictionally engaging and individually extending between said first mentioned friction members, a planetary gear operatively interconnecting said exterior and said interior shafts and having an outer gear wheel, another exterior shaft, a planetary gear operatively connecting said other shaft and said other exterior shaft and also having an outer gear wheel, and a gearing operatively interconnecting said outer gear wheels.

13. A speed changing frictional power transmission comprising, in combination, an exterior shaft, an interior shaft disposed coaxially with said outer shaft, a set of friction members axially displaceably connected and rotating with said interior shaft, another shaft, a set of counterfriction members axially movably connected and rotating with said other shaft and frictionally engaging and individually extending between said first mentioned friction members, a planetary gear operatively interconnecting said exterior and said interior shafts and having an outer gear wheel, another exterior shaft, a planetary gear operatively connecting said other shaft and said other exterior shaft and also having an outer gear wheel, a gearing operatively interconnecting said outer gear wheels, and free wheeling means associated with one of said outer gear wheels and locking the system formed by said outer gear wheels and said gearing in one direction of rotation.

14. A speed changing frictional power transmission as claimed in claim 13 and comprising a free wheeling means associated with said interior shaft and locking said interior shaft in one direction of rotation.

15. A speed changing frictional power transmission as claimed in claim 13 and comprising stationary support means supporting said interior shaft, and a free wheeling means interposed between said stationary support means and said interior shaft and locking said interior shaft in one direction of rotation.

16. A speed changing frictional power transmission, comprising, in combination, a center shaft, a set of friction members axially displaceably and rockingly connected with and rotating with said shaft, a plurality of outer shafts, a set of counterfriction members axially movably and rockingly connected with and rotating with said outer shafts and frictionally engaging and individually extending between said first mentioned friction members, supporting means rotatably supporting said outer shafts and being rotatable about said center shaft, said supporting means comprising a free wheel coupling which prevents rotation of said supporting means in one direction, position changing means associated with said supporting means and with said outer shafts for changing the distance between said center shaft and said outer shafts, and a counterweight associated with said position changing means for counteracting centrifugal forces set up in said position changing means.

JOSEF BEIER.